United States Patent [19]

Martin et al.

[11] Patent Number: 5,713,974
[45] Date of Patent: Feb. 3, 1998

[54] INSULATION MICROSPHERES AND METHOD OF MANUFACTURE

[75] Inventors: Alfred J. Martin; John Pidorenko, both of Saline, Mich.

[73] Assignee: ThermaCell Technologies, Inc., Holiday, Fla.

[21] Appl. No.: 619,835

[22] Filed: Mar. 19, 1996

Related U.S. Application Data

[62] Division of Ser. No. 300,961, Sep. 6, 1994.
[51] Int. Cl.$^6$ .................................................. C03B 8/02
[52] U.S. Cl. .................. 65/17.2; 65/21.4; 65/DIG. 11; 141/8
[58] Field of Search .......................... 65/17.2, 21.4, 65/DIG. 11; 141/8

[56] References Cited

U.S. PATENT DOCUMENTS

| | | | |
|---|---|---|---|
| 3,607,169 | 9/1971 | Coxe | 65/21.4 |
| 3,699,050 | 10/1972 | Henderson | 65/21.4 X |
| 3,769,770 | 11/1973 | DeChamps et al. | 52/404.1 |
| 4,039,297 | 8/1977 | Takenaka | 428/566 |
| 4,257,798 | 3/1981 | Hendricks et al. | 65/21.4 |
| 4,303,729 | 12/1981 | Torobin | 428/327 |
| 4,303,732 | 12/1981 | Torobin | 428/333 |
| 4,336,338 | 6/1982 | Downs et al. | 501/12 |
| 4,340,407 | 7/1982 | Anderson et al. | 65/21.4 |
| 4,349,456 | 9/1982 | Sowman | 252/317 |
| 4,431,749 | 2/1984 | Hettinger, Jr. et al. | 502/68 |
| 4,459,145 | 7/1984 | Elsholz | 65/21.3 |
| 4,547,233 | 10/1985 | Delzant | 149/2 |
| 4,548,767 | 10/1985 | Hendricks | 264/7 |
| 4,618,517 | 10/1986 | Simko, Jr. | 428/36 |
| 4,693,739 | 9/1987 | Manabe et al. | 65/21.4 |
| 5,055,240 | 10/1991 | Lee et al. | 264/5 |

Primary Examiner—Donald E. Czaja
Assistant Examiner—Sean Vincent
Attorney, Agent, or Firm—Harness, Dickey & Pierce, P.L.C.

[57] ABSTRACT

Evacuated microspheres, insulating materials constructed from such microspheres, and methods of manufacturing same provide insulation and reduce heat transfer through radiation, conduction and convection. Additionally, an infrared reflective coating is provided on a microsphere surface to reduce radiant heat transfer. A protective exterior coating is also provided to protect an exteriorly applied infrared reflective coating on such a microsphere. Furthermore, the spheroidal geometry of such microspheres restricts heat transfer to point-to-point conduction therebetween. Finally, evacuated microspheres further reduce through-heat transfer within a shell. One embodiment utilizes such evacuated microspheres in constructing an elastomeric roof coating which appreciably reduces cooling and air conditioning power costs for a building. An alternative embodiment utilizes such an elastomeric coating in constructing an exterior paint for a building. A method of evacuating such microspheres involves in-permeation of selected gases within a microsphere which reacts under sufficiently high temperatures with residual gases within the microsphere to produce by-product gases which out-permeate from within the sphere under sufficiently high temperatures. Furthermore, a method of constructing suitable glass microspheres which are suitable for evacuating via out-permeation is also described.

19 Claims, 1 Drawing Sheet

INSULATION MICROSPHERES AND METHOD OF MANUFACTURE

This application is a divisional of U.S. patent application Ser. No. 08/300,961, filed Sep. 6, 1994.

FIELD OF THE INVENTION

This invention relates to thermal insulating materials and more particularly to evacuated glass or polymeric microspheres and insulating coatings incorporating such microspheres, as well as methods of manufacturing same.

BACKGROUND OF THE INVENTION

Hollow microspheres and methods of producing them are presently known. Typically, these microspheres are utilized to form insulation materials and coatings. In one method of construction, a blowing gas is used to form hollow microspheres. Small glass particles are introduced into a heated zone, for example a furnace, where the elevated particle temperature decreases the glass' viscosity such that the glass behaves as a liquid and readily flows. The glass particles which have low viscosity and surface tension form glass droplets. Microscopically small bubbles form inside the droplets by a gas dissolved in the glass feed particles or generated from the volatilization of blowing agents which have been incorporated in the glass feed particles. The small bubbles coalesce to form a single and larger void within the glass droplet thereby producing a glass "bubble". The glass bubble expands in response to the blowing gases produced within the feed particles, in addition to the in-permeation of ambient gases while the bubble is held in the heated zone. Expansion stops when the bubble's internal pressure balances with forces produced by the combination of surface tension on the glass and the external ambient pressure. When bubbles exit the heated zone and are exposed to much lower temperatures, they rapidly solidify due to their relatively small heat capacity, thereby forming solid glass shells. Typically, this technique produces shells having a diameter ranging from approximately 5 microns to approximately 5,000 microns. However, all commercial shell manufacturing processes carried out in this general manner produce shells which contain appreciable residual gases.

The performance of thermal insulation is routinely described in terms of an R-value and an R-value/inch. The R-value/inch is the same as the reciprocal effective thermal conductivity, in the units of hr-ft$^2$-°F./BTU-inch. As an example, conventional fiberglass insulation has an R-value/inch of 3 or more, and an R-value for a 9 and ½ inch layer is 30, all numbers for normal room temperature. However, an inch of stagnant air has a higher R-value, 5.5. The fiberglass is needed to preclude convection, bulk movement of air, which if allowed to occur significantly decreases the R-value, much more so than does the presence of the fiberglass, which is an alternative conduction path. Much higher performance insulation materials and configurations are needed. Hollow microspheres are an alternative insulation material with improved thermal performance characteristics.

The use of evacuated glass microspheres as an important component of improved insulation has been recognized for some time. The use of a reflective layer within or outside of such a shell has also been referred to. An excellent reference to these effects is the patent by Torobin, U.S. Pat. No. 4,303,732. Torobin reports R-value/inch of 3 to 11 for glass shells with a low thermal conductivity gas within the shell; an R-value/inch of 5 to 15 for glass shells with a low thermal conductivity gas within the shells and a low emissivity, reflective coating; an R-value/inch of 25 to 35 for evacuated shells with a low emissivity reflective layer; and other ranges of R-value/inch, up to 70, for alternative insulation configurations. The specific details of the microspheres, such as sphere aspect ratio are not reported.

To produce better-value insulation based upon the incorporation of shells in the overall insulation, efforts have focused upon shell evacuation to minimize the thermal conduction of the contained gas and on producing a high aspect ratio shell to minimize the shell-wall conduction, but with limited success. As a review, the effective thermal conductivity of shells is a function of the shell aspect ratio, wall material (such as glass or polymer) and the shell gas composition and pressure. In general, the lower the thermal conductivities of the wall material and the internal gas, the lower the effective shell thermal conductivity. For the internal gas the higher the effective molecular weight, nominally, the lower the thermal conductivity. For example, at 120° F. the thermal conductivities of hydrogen, steam, air, CO2, SO2 and butane (gas) are 0.115, 0.014, 0.016, 0.01, 0.0060 and 0.011 BTU-ft/hr-°F.-ft$^2$ ("Chemical Engineering Handbook", 3rd Edition, Perry, McGraw-Hill). At sufficiently low pressures the mean free path of the gas molecules is large compared to the shell inner diameter and the conduction through the gas becomes much less, and essentially linear with pressure. For a particular gas in shells of approximately 100 micron inside diameter, the thermal conductivity decreases as the gas pressure decreases below a few Torr. Under these conditions the lower the pressure the lower the thermal conduction through the internal gas. However, there are practical limits to how low a gas pressure is needed depending upon the shell wall material and shell aspect ratio. For each case there are diminishing return limitations.

Under some conditions the conduction through the shell wall can dominate (as for example a low aspect ratio shell of a high thermal conductivity wall material) the overall heat transfer, regardless of the internal gas pressure and composition. Both glass shells and polymer shells are available. The thermal conductivity of the polymers (approximately 0.1 BTU-ft/hr-°F.-ft$^2$) used for shells is much lower than that for glasses (approximately 0.6 BTU-ft/hr-°F.-ft$^2$) used for shells. Thus polymer shells are preferred for selected applications for which their other properties are acceptable. Glass shells are, however, the dominant candidates for insulation applications. The shell aspect ratio must be as high as feasible to minimize the shell thermal conductivity. The manufacturing process and application conditions dictate the aspect ratio. However, there are limits to how high the shell aspect ratio can realistically be for the particular application. Mechanical loading on the shells, for example, can cause loss of mechanical integrity and thus pose a limit on aspect ratio.

To maximize the possible insulation value of micro shells, attempts have been made to evacuate shells or directly manufacture evacuated shells. One apparently successful out-permeation of residual gases from borosilicate glass shells (type B12AX produced by the 3M Corporation) was reported by Parmley and Cunnington, (R. T. Parmley and G. R. Cunnington, "An Ultra-lightweight, Evacuated, Load-bearing, High Performance Insulation System," Proceedings of 2d AIAA and ASME Thermophysics and Heat Transfer Conf., Palo Alto, Calif., (1978)). Residual gases in such shells were reported to be 99.97% SO$_2$ and 0.03% air, at a total pressure of 2.1×10$^2$ Torr. Parmley and Cunnington claim to have obtained internal pressures of ≦0.1 mTorr by baking shells in a vacuum at nominally 421° C. for 20 days. The aforementioned glass shells (type B12AX) were an experimental product being developed by 3M. Currently, shells of essentially the same glass composition (a soda-lime borosilicate) and containing similar gases are commercially available from 3M.

As an example of attempts to manufacture evacuated shells refer to Torobin, U.S. Pat. No. 4,303,732, which reveals a process for manufacturing vacuum microspheres. This process is based on blowing individual shells from a molten glass or plastic using a coaxial nozzle. The blowing gas flows through the inner nozzle and the glass flows through the annulus about the inner nozzle thereby forming a glass bubble, which is subsequently detached by vibration or the action of a second transverse gas stream.

The vacuum can be formed by any of several ways, such as entraining into the blowing gas, particles of metal or metal organic compounds which will become gaseous at the molten glass temperature, and which upon cooling will re-solidify and form a reflective film on the inner surface of the microshell. The residual gas pressure at room temperature results from any trace in-permeated gas plus the vapor pressure of the metal. With a proper choice of metals, the film will exhibit a very low vapor pressure. Apparently, this process has been successfully demonstrated, but is not commercially viable.

Coxe, in U.S. Pat. No. 3,607,169, reveals a similar process. Again, the production of the shell is based on the use of metals as blowing agents. In this case, glass-coated metal particles are made by an extrusion method. As in the case of the Torobin patent, this process is not commercially practiced.

Sowman, in U.S. Pat. No. 4,349,456, reveals a process for making ceramic metal oxide shells, which is nevertheless similar to Coxe and Torobin in that it also requires generating individual feed particles or droplets. The process does not utilize a blowing gas. It consists of forming droplets of an aqueous metal oxide sol and introducing them into a dehydrating liquid which rapidly removes the water from the droplet forming a gelled microcapsule. These microcapsules are then recovered by filtration, dried, and fired to convert them into shells. Prior to firing, the microcapsules are sufficiently porous that when placed in a vacuum during the firing process the gases can be removed, and subsequently the resulting shells will generally be impermeable to ambient gases. This process is not commercially practiced.

As examples of a different approach to microshell manufacture, one that employs steam as a furnace atmosphere component, refer to Manabe et al., in U.S. Pat. No. 4,693,739 and Downs and Miller, in U.S. Pat. No. 4,336, 338. In these references significant partial pressures of steam as furnace atmospheres are used to obtain advantages in the production of microspheres. There is also reference to water dissolved in the shell material to act as a blowing agent. These two patents do not claim to give evacuated microshells, but do represent an alternative manufacturing scheme that has useful characteristics that we plan to expand upon and further develop to produce microshells that have much more easily removed enclosed gas.

SUMMARY OF THE INVENTION

Pursuant to this invention, microspheres, insulating coatings containing same, and a method of evacuating same, are provided with shells formed from glass or polymeric material which is substantially evacuated to impart a high thermal insulation value. Coatings containing such insulating microspheres will likewise have a high insulating value.

When forming insulating layers, it is desirable to reduce the heat transfer which occurs between surfaces at different temperatures by all three heat transfer mechanisms, namely radiation, conduction (through both solids and gases) and convection, when possible and appropriate. The microspheres of this invention can provide characteristics which reduce all three heat transfer mechanisms. The insulation applications of this invention use material shells of such small characteristic dimensions such that convection effects are unimportant. Conductive heat transfer and radiative heat transfer are functions of material selections and design and performance requirement considerations, and are to be minimized.

To reduce conductive heat transfer, two general aspects of microshell design and manufacture are important. The first is related to the shell wall, the aspect ratio and the wall material; the second is related to the contained gas, the composition and pressure. In terms of shell wall, the lower the thermal conductivity of the wall material and the higher the aspect ratio of the shell, the lower the conductive heat transfer. As an example, polymeric wall material has an appreciably lower thermal conductivity than glass. Thus, the use of such low thermal conductivity polymer is preferred where this is consistent with other application considerations. Similarly, as high a shell aspect ratio as feasible, consistent with other application considerations, is preferred. In these manners the thermal conduction contribution by the shell wall can be minimized.

In like consideration, the thermal conduction contribution of the microshell gas content can be lessened by the appropriate choice of internal gas composition and total pressure. A lower thermal conduction contribution is associated with a higher molecular weight gas at a low pressure. In terms of microshell manufacture, the choice of blowing gas relative to the application of the microshells is an important consideration. Gases such as $CO_2$ and $SO_2$ are normally used. Water has been referred to as steam. Metal vapor has been referred to. What is most economically reasonable depends upon technical and cost trade-offs as appropriate to the overall manufacturing process for microshell production and the specific application for such microshells.

Where suitable shells are not available for performing in-permeation and out-permeation, a method of shell manufacture is also disclosed which produces glass shells that are easily evacuated with the methods of this invention in order to achieve low internal pressures. A long vertical furnace utilizes steam as its furnace atmosphere, wherein water or steam is contained within glass particles that acts as a blowing agent to form the shells under furnace conditions. The resulting shells contain steam with trace amounts of air in its accompanying constituents. The shells are then in-permeated with hydrogen in order to react the trace gases and are subsequently raised to an elevated temperature and out-permeated to remove steam from the evacuated shells.

A consideration in insulation applications is the significance of radiative heat transfer. A low emissivity coating on microspheres can decrease radiative heat transfer. However, there are applications for which radiative heat transfer is of minor consequence, even for high emissivity. Thus the use of a reflective layer (low emissivity) is a design parameter and for some insulation applications is not of any real use, and not worth the expense.

The work by the authors on heat transfer studies has resulted in a thermal model that we have used to predict insulation layer performance, and also essentially confirm much of Torobin's reported results. As a result of these efforts, it is clear that much improvement in insulation performance can be achieved by using in the insulation layer small diameter (50 to 100 microns) high aspect ratio (shell outside diameter divided by average shell wall thickness) glass or polymer shells that are evacuated, or at least contain a low thermal conductivity gas.

At one extreme, insulation layers based upon evacuation high aspect ratio shells, when coated with a low emissivity, reflective layer, and evacuated space between the shells, the R-value/inch can approach that of super-insulation. For a reflectivity of 0.9, with all space evacuated, an R-value/inch of near 3000 is predicted for a microsphere diameter of 100 microns with a shell aspect ratio of 100 and negligible contact conductance between the shells. Similarly, if the reflectivity drops to 0.0, i.e., a perfect absorber/emitter, then the predicted R-value/inch drops to about 300. For those insulation applications for which all the space within the insulation layer is evacuated, the role of layer reflectivity is especially important.

Clearly there is strong motivation for evacuated high aspect ratio shells that have low thermal conductivity wall material. Polymer shells have the advantage of lower thermal conductivity compared to glass. However, other physical properties of polymer shells restrict the use of such shells to more narrow temperature limits when compared to glass shells. For a much broader range of thermal insulation applications, glass microspheres are the preferred material and shape of interest.

One application of microshells employs such shells in a roof coating to enhance the insulation and improve the solar reflectivity characteristics of the coating. Preferably, the microshells are made of lower thermal conductivity glass and are evacuated. These microshells could be manufactured as evacuated, or could be evacuated after manufacture. Such an evacuation method is detailed.

For the case where microspheres must be evacuated, gaseous constituents which are trapped within the shells as a result of shell manufacture are reacted with hydrogen to form a gaseous mixture which can be removed through a procedure of out-permeation. Preferably, where oxygen is present within the glass shell, hydrogen is permeated through the walls of the shell to form a reactive gaseous mixture at elevated temperature. In this case, the hydrogen within the shell will react with oxygen to form steam. Other gases, for example carbon dioxide would react with the hydrogen to form carbon monoxide and steam. Further reactant gases within the shell will also react with the hydrogen, or else with the products of other hydrogen reactions. After completion of the reactions, the remaining hydrogen and other formed gases will be removed by out-permeation. During this out-permeation process, a partial vacuum is formed around the spheres to remove the gases.

For heat transfer applications for which radiative heat transfer is significant a highly reflective microshell coating is preferably formed on the shell to reduce the radiant heat transfer. Preferably, the reflective coating is a metal layer formed on the exterior of the shell. Alternatively, the reflective coating may be formed on the inner surface of the shell, preferably as a by-product of the product gases formed by the reactions within the microsphere.

Further additional advantages are provided by the present invention when utilizing microspheres constructed according to the teachings of this invention. Further thermal insulation value and utility is obtained when a plurality of such microspheres are assembled or nested together, particularly when forming a coating, since the highly spherical and hard shells resist flexing and maintain a point contact conduction relative to one another which reduces conduction therebetween. Such point contact significantly reduces interconnecting surface areas which greatly decreases conduction therebetween as well as conduction through a surface or a material formed from such spheres.

Objects, features and advantages of this invention are to provide a microsphere and method of making it which greatly increases thermal insulation value of a material constructed with such microspheres by reducing conduction, radiation, and convection therethrough.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
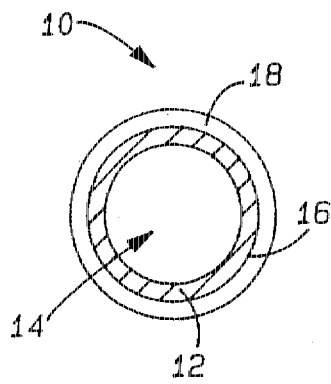
FIG. 1 is a cross-sectional schematic diagram of the microspheres, or shells, of this invention for forming thermally insulating materials.

Referring in more detail to the drawings, FIG. 1 illustrates a small insulating microsphere 10 formed from a glass or polymer shell 12 having an evacuated interior 14 such that the microsphere provides reduced heat conduction and is optimal for constructing insulating materials and coatings. A highly infrared (IR) reflective coating 16 may be provided preferably on the exterior of shell 12 to reduce radiant heat transfer. Furthermore, a protective-low thermal conductivity transparent coating 18 may be provided over reflective layer 16 to protect the reflective coating from degradative processes.

Preferably, the reflective coating 16 is formed from a layer of metal which is deposited on the shell 12 to provide a highly reflective surface in the infra-red region. In the preferred version, the metal coating is formed on the outer surface of shell 12. Alternatively, reaction products which result from the reaction of residual gases within the microsphere 10 which were used in constructing the shell 35 can be condensed out on the interior surface of the shell 12 to provide such an interior coating. In either case, the shell 12 is preferably coated with a thin reflective coating generally of a metal such as, but not limited to, Al, Zn, Ag, Cu, Au, Ni, or Sn with thicknesses being preferably less than or equal to 50 nm and more preferably in the range of 30 to 50 nm and with emissivity of less than or equal to 0.04 in the IR (infra-red) range of radiation. Furthermore, such a reflective coating 16 can be provided on both the interior and exterior of shell 12 in order to further enhance reflection, particularly in the infra-red region, which further enhances the insulation properties of microspheres 10 as well as materials and coatings formed from such microspheres 10.

Preferably the glass or polymeric shells 12 are formed with a high AR (aspect ratio) in order to optimize thermal resistance. High AR refers to the ratio of the diameter of the shell 12 to the shell's wall thickness. The higher the AR the lower the shell's wall conduction. An AR over 100 is desired. However, some applications will require insulation which bears high loads which will necessitate use of smaller AR's at the expense of thermal resistance.

When constructing microsphere 10, a substantially evacuated shell 12 is required to enhance the conduction properties of the microsphere 10. In order to achieve the desired evacuated microsphere 10, a method for evacuating such shells 12 is described below. This process utilizes the permeation of gases through the walls of the shell 12 at sufficiently high temperature to change and remove the residual gases within the shell 12 which are formed during its manufacture. The types of residual gases remaining in the shells 12 after manufacture are dependent on the specifics of each manufacturing process. For example, commercially available shells 12, not manufactured with subsequent shell evacuation as an anticipated step, often contain $CO_2$ and CO, or $SO_2$ and $O_2$. Certainly other blowing gases are alternatives, such as $H_2O$, $O_2$.

Construction of Shells

In order to obtain viable evacuated shells 12 for constructing microspheres 10 of this invention, either a method is used to directly produce evacuated glass or polymeric shells 12 or selected commercially available shells 12 are evacuated using the methods of this invention in order to produce the evacuated shells 12 required to construct the microspheres 10.

Blowing agents that lead to gases that can be more easily removed by the methods of this invention are first introduced into a glass mixture to obtain a homogenous mix for constructing such microspheres. The solid mixture of glass and blowing agents is then processed by existing, routine methods, e.g., the solid mixture can be subsequently crushed and the resulting frit particles introduced into a heated region where the particles 38 are blown into shells 12. By choosing the blowing agents such that they are either low vapor pressure solids at room temperatures as exemplified by selected patents by Torobin including U.S. Pat. No. 4,303,732, or by utilizing such blowing agents which can later be removed from the shells 12 with an evacuation procedure, glass shells 12 can be subsequently evacuated.

Where commercially available shells 12 which are suitable for evacuation by the methods of this invention are not available, the following method is preferably used to directly produce suitable evacuated glass shells 12. First, raw materials for forming a desired glass composition are mixed. Secondly, the mixture of raw materials is reacted at low temperature to form a final composition of material. Then, the composition is partially dried, crushed, and size-separated into frit. Subsequently, a vertical furnace 36 is used to form and blow glass shells 12 at high temperature according to the below-mentioned procedure. The resulting completed shells 12 are then separated from shell residue, and the shells 12 are evacuated using the methods of this invention which removes water vapor from the shell interior 14. In this procedure, steam is utilized as the blowing agent during formation of the shells 12. The steam within the column results from the water which is retained in the injected glass frit 38, which has been only partially dried, and from steam separately injected into the vertical furnace 36. Typically, the water is contained in the raw materials used in forming the composition. With this procedure, basic raw materials are combined to produce glass shells 12 which are readily evacuated.

Figure 2:
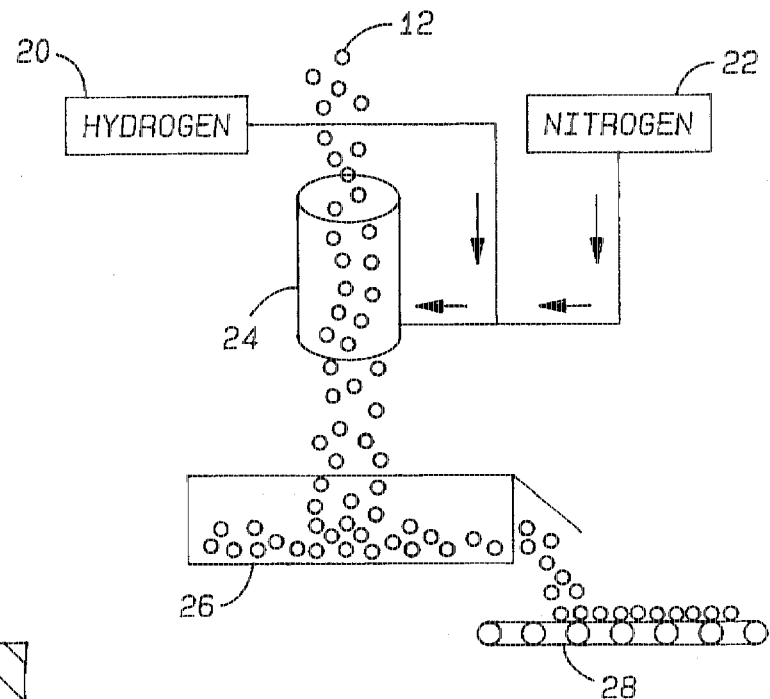
FIG. 2 is a schematic diagram depicting a method of evacuating microspheres to form the thermally insulating microspheres of this invention.
Figure 4:
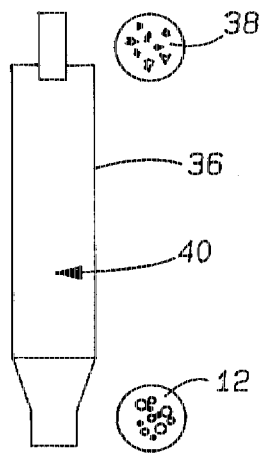
FIG. 4 is a schematic diagram depicting a method of manufacturing glass microspheres having properties which facilitate easy evacuation by the techniques depicted in FIG. 2 to achieve low internal pressures.

As shown in FIG. 4, the long vertical furnace 36 has an internal furnace atmosphere of steam 40 which receives the glass frit material 38 and water or steam contained in the frit 38 which acts as a blowing agent to form the shells 12 under the internal furnace atmosphere and thermal conditions. The furnace 36 is non-hazardous and prevents the in-permeation of undesirable gaseous constituents as a direct result of the furnace atmosphere 40. The steam which forms within frit particles 38 under elevated temperature is relatively easily removed from the shells 12 by high temperature evacuation through subsequent steps as described and shown in FIG. 2. The procedures for out-permeating the steam as described hereinafter are shown in FIG. 2 and are necessary to obtain evacuated microspheres 10 having insulation properties with the highest resistance (or maximum R-value) to conductive heat transfer. The degree of evacuation that is attainable within the shells 12 is a desirable design parameter when constructing insulating applications since loss of evacuation diminishes the insulating properties. Gaseous conduction therefore results which can only be decreased by further evacuation, or by the introduction of other gases having superior insulating properties therein. The typical characteristics of a glass shell wall, however, cannot be further tailored to improve insulation. It is generally understood that internal pressure drops beyond a few Torr decrease the conductivity of the gases, and further pressure drops further decrease the conductivity. However, the shell 12 conductivity of glass does not decrease in nearly the same magnitude in response to pressure drops, even when pressure has been decreased to a pressure of 30 milli-Torr.

When constructing frit particles 38 to produce shells 12, the raw materials and constituents can be modified to provide glass shells 12 which further enhance effective evacuation. In particular, the in-permeation of hydrogen at elevated temperatures and a subsequent reaction of the hydrogen with certain gaseous constituents in a glass shell 12 will allow removal of reaction product more easily. For example, oxygen inside a shell 12 can be reacted with in-permeated hydrogen to form steam which is more easily and readily removed than the oxygen. Other approaches can be utilized to derive more readily and easily out-permeated gases using various other modified constituents within glass frit particles 38.

Further alternative variations can be provided wherein frit particles 38 contain metals which partially vaporize to blow the shell 12 and which coat the inner surface of the shell 12. By adding an appropriate amount of metal, an appropriate thickness of an internal metal coating 16 can be obtained which gives a high reflectivity (or a low emissivity), but which does not increase in thickness sufficiently to increase the shell 12 thermal conductivity. Typically, an internal coating thickness of at least 10 nanometers is required. Furthermore, chemical vapor deposition is an alternative coating technique.

FIG. 2 shows the method for evacuating shells 12 of this invention when constructing the microspheres 10 depicted in FIG. 1. This method relies on the permeation through the walls of the shells 12 by gases when subjected to sufficiently high temperatures.

The transfer of a gas across a shell wall is normally described as the permeation of the gas through the wall, and the rate of transfer is proportional to a pressure difference across the shell wall. A proportionality constant, termed the permeability is a function of the wall material composition, the permeating gas composition, and temperature. This permeability is normally measured under steady-state conditions of a partial pressure driving force. It is, however, routinely used for describing the transient behavior of pressure within the shells 12 when shell 12 filling or emptying is done. In more fundamental terms, permeability is the product of the diffusivity and the solubility of the gas in the wall material. Qualitatively, permeability increases dramatically with an increase in temperature. Permeability is extensively discussed in "The Scientific Foundations for Vacuum Technology", S. Dushman, 2nd Edition, John Wiley and Sons, NU, 1962, pp. 491–500, hereinafter incorporated by reference.

The rate of diffusion generally increases as the size (or molecular weight) of the permeating gases decreases; e.g., helium and hydrogen readily permeate shells, neon and argon permeate more slowly, oxygen and nitrogen permeate much more slowly, and gases such as $CO_2$ permeate negligibly even at maximum practical temperatures.

Based on the above, it is part of this invention to process the gases inside the shells 12 in order to obtain product gases that can more readily permeate the shells 12.

In summary, the innovative method for evacuating glass micro spheres 10 of this invention uses the high permeability of glass to hydrogen and other gases and the reactivity of certain gases with such hydrogen to form other gases which can be more easily removed from the interior of the shells 12. To permeate hydrogen through glass shells 12 relatively rapidly, the temperature is elevated to a range of a few to several hundred degrees Centigrade and total pressures of a few to several atmospheres are used which will allow the reaction of hydrogen with the other gaseous constituents within the manufactured shell 12. In practice, hydrogen which permeates into the shell 12 comes from a mixture with a relatively non-permeable inert gas, such as nitrogen, which is provided on the exterior of the shells 12. Once the shells 12 have been filled with hydrogen through permeation from an external gas mixture, the shells 12 are maintained at a temperature which permits thermodynamically favored reactions to occur within the shell's interior 14. For example, oxygen will combine with the hydrogen to form steam. Likewise, carbon dioxide when combined with hydrogen will form carbon monoxide and steam. Other reacting gases within the shell 12 will also react with the hydrogen, or with the products of other hydrogen reactions. The temperature sometimes required will depend upon the original constituents present within the shells 12, which will depend on the manufacturing process used to construct the shells 12. The shell's gaseous contents which result depend upon the methodology used in the shell 12 manufacture and the starting glass-forming reactants.

Once the reactions have completed, the resulting hydrogen and other gases are removed by out-permeation into a partial vacuum relative to the gases to be removed. The amount of vacuum needed to achieve this result depends upon the time allowed for the out-permeation, the product gases which are formed by the reactions, the glass composition, and the temperature of the out-permeation.

As depicted in FIG. 2, a supply of hydrogen 20 and a supply of nitrogen 22 are mixed and fed into a permeation/reaction chamber 24. In the reaction chamber 24, the shells 12 are exposed to a nitrogen and hydrogen mixture of gases while maintained at elevated temperature and elevated pressure. Preferably, the elevated temperatures reach at least a nominal 350° C. and the pressure is at least a few atmospheres. In the preferred variation, the following reactions occur within the chamber:

$$2H_2 + O_2 = 2H_2O; \tag{3}$$

$$CO_2 + H_2 = H_2O + CO \tag{4}$$

After feeding these spheres through the permeation/reaction chamber 24, the shells 12 are received in an out-permeation chamber 26 where staged out-permeation occurs at elevated temperatures (nominal 350° C.), and at a partial vacuum. The time and temperature for this out-permeation depends upon the glass and gas composition within each sphere 12. Subsequent to appropriate out-permeation of the gases in the chamber, shells are passed and directed onto conveyor 28 for delivery to packaging. These spheres 10 are delivered with gases their interiors 14 at reduced pressure and exhibiting lower thermal conductivities. For example, construction of spheres 10 according to FIG. 2 provide for shells 12 retained in-permeation reaction chamber 24 for 3 or more hours at 350° C. temperature and in the range of 3–10 atmospheres pressure. Subsequently, the shells are delivered to an out-permeation chamber 26 for 12 or more hours at 350° C. temperature and in the range of 1–10 milliTorr pressure.

Construction of Insulation Coatings

Figure 3:
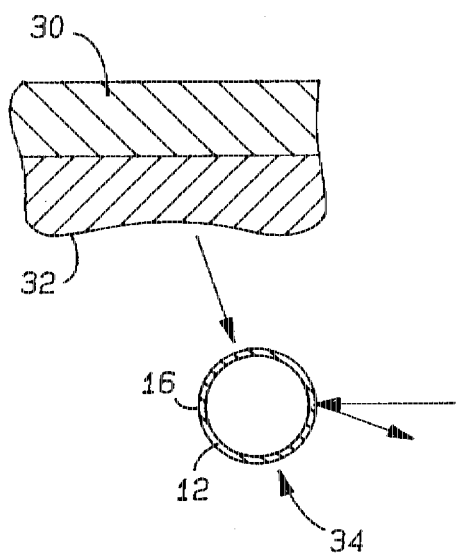
FIG. 3 is a fragmentary cross-sectional view of a tile having an insulating coating constructed with the microspheres of this invention.

FIG. 3 depicts a wall tile 30 having an insulation coating 32 retained on the tile 30 which contains insulating microspheres 34 of this invention. Spheres 10 are constructed of hollow glass shells 12 having a metal coating 16. Such microspheres 10 are evacuated utilizing the methods of this invention to reduce conduction through the spheres 10. Alternatively, such a shell 12 can be constructed of a plastic material.

Insulation coating 32 contains an admixture of well known binders, pigments, extenders, protective additives, in addition to the microspheres 10, which are joined and bonded together to form the insulation coating. The binders bond the coating 32 to the tile 30 and solidify and enforce the coating 32 which retains the microspheres 10 therein. A non-exhaustive and illustrative listing of the above binders, pigments, extenders, and protective additives generally includes various UV absorptive pigments, latex and acrylic materials. Furthermore, such a coating 32 can be used with or without the metal coating 16 provided on each shell 12, depending upon the details of the specific application and requirements for the coating in use. Such coatings may also be used for roofs, for exterior paint and interior paint, and other uses. The evacuated shells 12 provide a crucial component in formulating a coating 32 which allows attainment of appreciably decreased thermal conductivity, and helps develop and retain a high reflectivity to solar and other infra-red radiation. A combination of long-term high IR reflectivity and low thermal conductivity decreases the energy loading, resulting from absorption and transference of heat, into a coated enclosure. For example, such a coating 32 could be utilized within an infra-red oven to retain heat more efficiently therein and enhancing the cooking operation of process.

When formulating elastomeric roof coatings and exterior paints, it is desirable to utilize the evacuated shells 10 in combination with other high quality constituents to obtain a coating 32 which is especially reflective of solar radiation, which has a low thermal conductivity, and appreciable reduces cooling and air conditioning power cost due to the increased solar reflectivity and lower thermal conductivity.

These coatings 32 are preferably elastomeric to obtain excellent long-term adhesion to a variety of surfaces. An example of a preferred formulation of an elastomeric roof coating, based upon highest quality constituents and glass shell 12 is as follows:

| Item No. | Material | Mass lbs. | Volume Gal. |
| --- | --- | --- | --- |
| 1 | Water | 84.50 | 10.14 |
| 2 | Troysan 186 2(hydroxymethyl) amino)-2-methyl proponal | 2.00 | 0.24 |
| 3 | KTPP (potassium tripolyphosphate) | 1.25 | 0.05 |
| 4 | Tamol 850 dispersing agent (sodium salt of polymer carboxylic acid and water) | 8.00 | 0.81 |
| 5 | TiO2, Kronos 2102 (titanium dioxide) | 152.00 | 4.56 |
| 6 | ZnO ZOCO 103 (zinc oxide) | 31.00 | 0.66 |
| 7 | Natrosol 250 HBR (sifted In) (hydroxyethyl cellulose) | 1.00 | 0.09 |
| 8 | PA-328 proprietary blend defoamer manufactured by United States Movidyn Corp. 863 N. Orleans St. Chicago, IL 60610 | 5.25 | 0.75 |
| 9 | Propylene Glycol | 34.56 | 4.00 |
| 10 | Rhoplex EC 2540 (ground until smooth) (acrylic polymer and water) | 423.50 | 48.34 |
| 11 | Texanol (alcohol blend solvent 2,2,4-trimethyl-1,3-pentanedial, monoisobutyrate, and 2,2,4-trimethyl-1,3-pentanedial diisobutyrate) | 7.00 | 0.88 |
| 12 | Skane M8 microbicide (2-N-octyl-4-isothiazolin-3-one, and propylene glycol) | 1.60 | 0.19 |
| 13 | PA-328 | 5.76 | 0.82 |
| 14 | Glass/polymer shells | 50.00 | 30.12 |
| 15 | Acrysol RM-825 thickening agent (polyurethane resin, diethylene glycol monobutyl ether, and water) | 0.68 | 0.08 |
| | | 808.10 lbs. | 101.74 gal. density 7.94 lbs/gal |

Preferably, the diameter of shells 12 utilized in the formulation of microspheres 10 when constructing the insulation coating 32 is dependent highly upon the details of the formulation, and especially the nominal required thickness for the dry coating film. For most coatings 32, the microsphere 10 will have a diameter nominally of 20–100 microns. For an insulation coating 32 which is utilized on a roof, the diameter range of the shells 12 could be larger. The nominal wall thickness range of the shells 12 would be from less than 1 to several microns, depending upon the method of applying the coating to the substrate and thus the corresponding strength demands for the shells 12.

The shells 12 utilized in constructing the coating 32 can be purchased under several trademarks from several manufacturers, including K-25 as manufactured by Minnesota Mining and Manufacturing Company of 3M Company, 3M Center, Saint Paul, Minn. The evacuation of these commercially available shells 12 can be accomplished as described infra utilizing the techniques of this invention. Furthermore, other various known techniques for evacuating shells 12 may be utilized.

A further example of a thermal insulating coating of this invention is apparent where water is used as a binding agent with evacuated microspheres to provide a packing insulating material for application to an animals injured leg, for example for application on a horse. Such a packing would provide heat retention to the injury which functions as a thermal insulating bandage or heat pack.

It is to be understood that the invention is not limited to the exact construction illustrated and described above, but that various changes and modifications may be made without departing from the spirit and scope of the invention as defined in the following claims.

I claim:

1. A method for producing hollow evacuated, microspheres comprising:

providing a mixture of glass material particles and a blowing agent;

processing the glass particles and the blowing agent to form a frit with at least some of the blowing agent being contained within the glass particles;

heating the frit in a furnace at temperatures where the viscosity of the glass particles is sufficiently low that a liquid glass droplet is formed about portions of the blowing agent;

vaporizing the blowing agent into a blowing gas upon which the liquid glass droplet is blown into a glass bubble;

in-permeating a reactive gas into the glass bubble;

reacting the reactive gas with gas constituents within the glass bubble to produce reaction products;

out-permeating from the glass bubble the reaction products to produce an at least partial evacuated glass bubble; and solidifying the glass bubble to form an at least partially evacuated hollow glass microsphere.

2. The method of claim 1 wherein the blowing agent produces steam as the blowing gas.

3. The method of claim 1 wherein the blowing agent comprises low vapor pressure metallic particles which vaporize to produce the blowing gas, wherein the vaporized metallic particles coat the inside of the resulting bubble.

4. A method of claim 1 wherein the blowing agent is a silica sol gel.

5. The method of claim 1 wherein said blowing agent includes small metal particles, further comprising coating said small metal particles with glass by chemical vapor deposition.

6. The method of claim 1 wherein said blowing agent includes small metal particles, further comprising coating said small metal particles with glass by RF sputter deposition.

7. The method of claim 1 wherein the step of providing a mixture further includes the steps of providing raw materials for forming a glass composition, reacting the raw materials to form glass particles of a final glass composition.

8. The method of claim 7 further comprising the step of partially drying the glass particles.

9. The method of claim 7 further comprising the steps of crushing the glass particles and size separating the crushed glass particles.

10. The method of claim 1 wherein the reactive gas includes hydrogen.

11. The method of claim 1 wherein the gas constituents include oxygen.

12. The method of claim 1 wherein the reaction products include steam.

13. The method of claim 1 further comprising the step of locating the glass bubble within an in-permeation atmosphere of hydrogen.

14. The method of claim 3 wherein the vaporized metallic particles coat the inside of the glass bubble and form an IR reflective coating thereon.

15. The method of claim 1 further comprising the step of transferring the glass bubble from a blowing chamber to an evacuation chamber where said steps of in-permeating and out-permeating are performed.

16. The method of claim 15 wherein the glass bubble is solidified before being transferred to the evacuation chamber.

17. The method of claim 15 wherein the glass bubble is heated to a reaction temperature in the evacuation chamber, the reaction temperature being thermodynamically conducive to the reacting of the reactive gas with the gas constituents.

18. The method of claim 15 wherein the evacuation chamber is maintained under a partial vacuum during out-permeation.

19. The method of claim 15 wherein the evacuation chamber is maintained under a positive pressure during in-permeation.

* * * * *